(12) United States Patent
Eidelpes et al.

(10) Patent No.: US 11,699,534 B2
(45) Date of Patent: Jul. 11, 2023

(54) DEVICES AND SYSTEMS FOR MATERIAL TRANSPORTATION

(71) Applicants: Battelle Energy Alliance, LLC, Idaho Falls, ID (US); UT-Battelle, LLC, Oak Ridge, TN (US); Battelle Memorial Institute, Richland, WA (US)

(72) Inventors: Elmar F. Eidelpes, Idaho Falls, ID (US); Joshua J. Jarrell, Idaho Falls, ID (US); Robert A. Hall, Lenoir City, TN (US); William J. Marshall, Knoxville, TN (US); Harold A. Adkins, Jr., Richland, WA (US); Brian M. Hom, Richland, WA (US)

(73) Assignees: Battelle Energy Alliance, LLC, Idaho Falls, ID (US); UT-Battelle, LLC, Oak Ridge, TN (US); Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/447,712

(22) Filed: Sep. 15, 2021

(65) Prior Publication Data
US 2023/0082559 A1 Mar. 16, 2023

(51) Int. Cl.
*G21F 5/14* (2006.01)
*G21F 5/12* (2006.01)
*G21F 5/015* (2006.01)

(52) U.S. Cl.
CPC ............... *G21F 5/14* (2013.01); *G21F 5/015* (2013.01); *G21F 5/12* (2013.01)

(58) Field of Classification Search
CPC .............. G21F 5/14; G21F 5/015; G21F 5/12
USPC ......... 250/505.1, 506.1, 507.1, 515.1, 516.1, 250/517.1, 518.1, 519.1
See application file for complete search history.

(56) References Cited

U.S. PATENT DOCUMENTS

2021/0343439 A1* 11/2021 Singh ..................... G21F 5/12

* cited by examiner

*Primary Examiner* — Nicole M Ippolito
(74) *Attorney, Agent, or Firm* — TraskBritt (57) ABSTRACT

Various embodiments relate to devices for transporting high-assay low-enriched uranium (HALEU). A device may include at least one section, wherein each section of the at least one section includes a number of storage tubes. Each storage tube, which is configured to receive and hold a container, extends from adjacent a first end of the section toward a second, opposite end of the section. Each section further includes a number of flux traps, wherein each storage tube of the number of storage tubes is at least partially surrounded by a flux trap of the number of flux traps. Associated systems are also disclosed.

25 Claims, 6 Drawing Sheets

DEVICES AND SYSTEMS FOR MATERIAL TRANSPORTATION

STATEMENT REGARDING FEDERALLY SPONSORED RESEARCH OR DEVELOPMENT

This invention was made with government support under Contract Nos. DE-AC07-05-ID14517, DE-AC05-00OR22725, and DE-AC05-76RL01830 awarded by the United States Department of Energy. The government has certain rights in the invention.

FIELD

Embodiments of the disclosure relate generally to devices and systems for material transportation. More specifically, various embodiments of the disclosure relate to devices and systems for transporting material, such as nuclear reactor fuel (e.g., high-assay low-enriched uranium (HALEU)). Yet more specifically, various embodiments of the disclosure include a device that includes a number of compartments for receiving containers of material and a number of flux traps for surrounding the containers. Yet other embodiments of the disclosure include containers for holding a material, and systems including a package, and a device configured to be secured within the package and hold a number of containers.

BACKGROUND

The current generation of light water nuclear reactors (LWRs) is designed to use low-enriched uranium (LEU) fuel with $^{235}$U enriched to 5 wt % or less. Supporting systems, such as fuel production facilities and transportation systems, and associated regulations, are primarily designed for the requirements of LEU LWRs. Recently, however, interest has been increasing in a new generation of nuclear reactors, including non-LWR designs with higher fuel enrichment. Many next-generation nuclear reactor designs require uranium fuel enriched to 5 to 20 wt % $^{235}$U, which is referred to as "high-assay low-enriched uranium" or "HALEU."

Transporting HALEU includes many challenges, including various technical challenges and regulatory hurdles. Current U.S. Nuclear Regulatory Commission (NRC) approved transportation package designs for uranium hexafluoride ($UF_6$) with enrichments above 5 wt % provide relatively small payloads (e.g., ≤116 kilograms). Furthermore, in accordance with various regulatory requirements (e.g., U.S. regulatory requirements), transportation package designs for fissile material enriched above 5 wt % need to consider water infiltration in the containment as part of criticality safety evaluations.

BRIEF SUMMARY

One or more embodiments of the disclosure include a device. A device may include at least one section, wherein each section of the at least one section includes a number of storage tubes. Each storage tube, which may be configured to receive and hold a container, extends from adjacent a first end of the section toward a second, opposite end of the section. Further, each section of the at least one section includes a number of flux traps, wherein each storage tube of the number of storage tubes is at least partially surrounded by a flux trap of the number of flux traps.

According to one or more other embodiments of the disclosure, a device includes a first portion and a second portion positioned adjacent the first portion. Each of the first portion and the second portion includes a number of sleeves, wherein each sleeve of the number of sleeves extends from adjacent a top plate of an associated portion toward a baseplate of the associated portion. Each of the first portion and the second portion further includes a number of flux traps, wherein each sleeve of the number of sleeves is at least partially encased by a flux trap of the number of flux traps.

Other embodiments include a system. The system may include a package and a basket configured to be positioned within the package. The basket may include a first, upper tier section and a second, lower tier section. Each of the first, upper tier section and the second, lower tier section may include a number of compartments, wherein each compartment of the number of compartments is configured to receive a container. Each of the first, upper tier section and the second, lower tier section may further include a number of sleeves, wherein each sleeve of the number of sleeves at least partially surrounds an associated compartment of the number of compartments.

According to one or more other embodiments of the disclosure, a system includes a number of containers and a basket. The basket includes a number of tubes, wherein each tube of the number of tubes is sized and configured to receive and secure a container of the number of containers. The basket further includes a number of flux traps, wherein each flux trap surrounds an associated tube of the number of tubes.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of example embodiments of the disclosure when read in conjunction with the accompanying drawings, in which:

DETAILED DESCRIPTION

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the disclosure unless specified otherwise herein. It will be readily apparent to one of ordinary skill in the art that the various embodiments of the disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Development and commercialization of various advanced nuclear reactors (e.g., small modular reactors, microreactors, and fission batteries) have been increasing. Many advanced nuclear reactor concepts currently being investigated for deployment require fuel with higher enrichments. As noted above, some next-generation nuclear reactor designs require HALEU fuel, which is characterized by an enrichment between 5 and 20 wt % $^{235}$U. This has led to new regulatory and technical challenges in designing systems and devices for transporting fissile material. According to various regulations, payloads of standard $UF_6$ packaging models decrease significantly with increased enrichment, providing less than 116 kilograms (kg) of payload to transport $UF_6$ with enrichment above 5 wt %. As will be appreciated, increasing HALEU package capacity is desirable to reduce the number of shipments necessary (i.e., to transport HALEU) and thus increase efficiency in the nuclear industry.

Further, some regulations require subcriticality of the content of a transportation package even in the most reactive credible conditions during transport, except when transporting packages for $UF_6$ with an enrichment below 5 wt %. Thus, criticality safety evaluations of HALEU transportation systems and devices must take into account water leaking into a containment system, potentially complicating the demonstration of subcriticality. Furthermore, the anticipated physical form of uranium that needs to be transported for HALEU fuel production could be different from that of $UF_6$.

Various embodiments disclosed herein relate to solutions for relatively large-capacity and economical transportation of materials, such as reactor fuel. More specifically, various embodiments disclosed herein related to devices and systems for transporting relatively large amounts of reactor fuel, such as HALEU. For example, and as described more fully below, devices and/or systems described herein may allow for transportation of material (e.g., HALEU) with a payload of up to, for example, approximately 350 kg to approximately 400 kg (e.g., such as approximately 376 kg) of fissile material per package and, for example, approximately 1750 kg to approximately 2000 kg (e.g., such as approximately 1881 kg (e.g., five (5) packages at 376 kg/package)) of HALEU per legal weight truck (LWT).

Various embodiments disclosed herein provide criticality control through separation and distribution of reactor fuel in individual containers (i.e., to provide configuration control) and the utilization of tubes (e.g., flux traps) (i.e., to provide neutron absorption). Further, various embodiments comply with various regulatory requirements, such as U.S. regulatory requirements (e.g., requirements related to radiation level thresholds, subcriticality requirements, thermals requirements (i.e., capability to withstand the regulatory range of extreme temperatures), and structural, confinement, and containment requirements). Further, various embodiments described herein meet various subcriticality and mechanical performance requirements, and provide an increased payload compared to conventional systems and/or devices.

According to some embodiments, a device (also referred to herein as a "basket") may include a structure and a number of compartments for receiving a number of containers (e.g., canisters), wherein each container may be configured to receive and hold material (e.g., reactor fuel, such as HALEU). Further, according to various embodiments, each compartment of the device may be at least partially surrounded by a tube (e.g., a flux trap) (e.g., for criticality control). Further, in accordance with some embodiments, the device may be configured to be positioned and secured within a package (e.g., type B packaging) for transportation.

Moreover, some embodiments include a system including a package, a device (e.g., a basket) configured to be inserted into the package, and a number of containers configured to be inserted into the device. According to other embodiments, a system may include a device (e.g., a basket) and a number of containers configured to receive and hold material, such as HALEU.

Embodiments of the present disclosure will now be explained with reference to the accompanying drawings.

Figure 1:
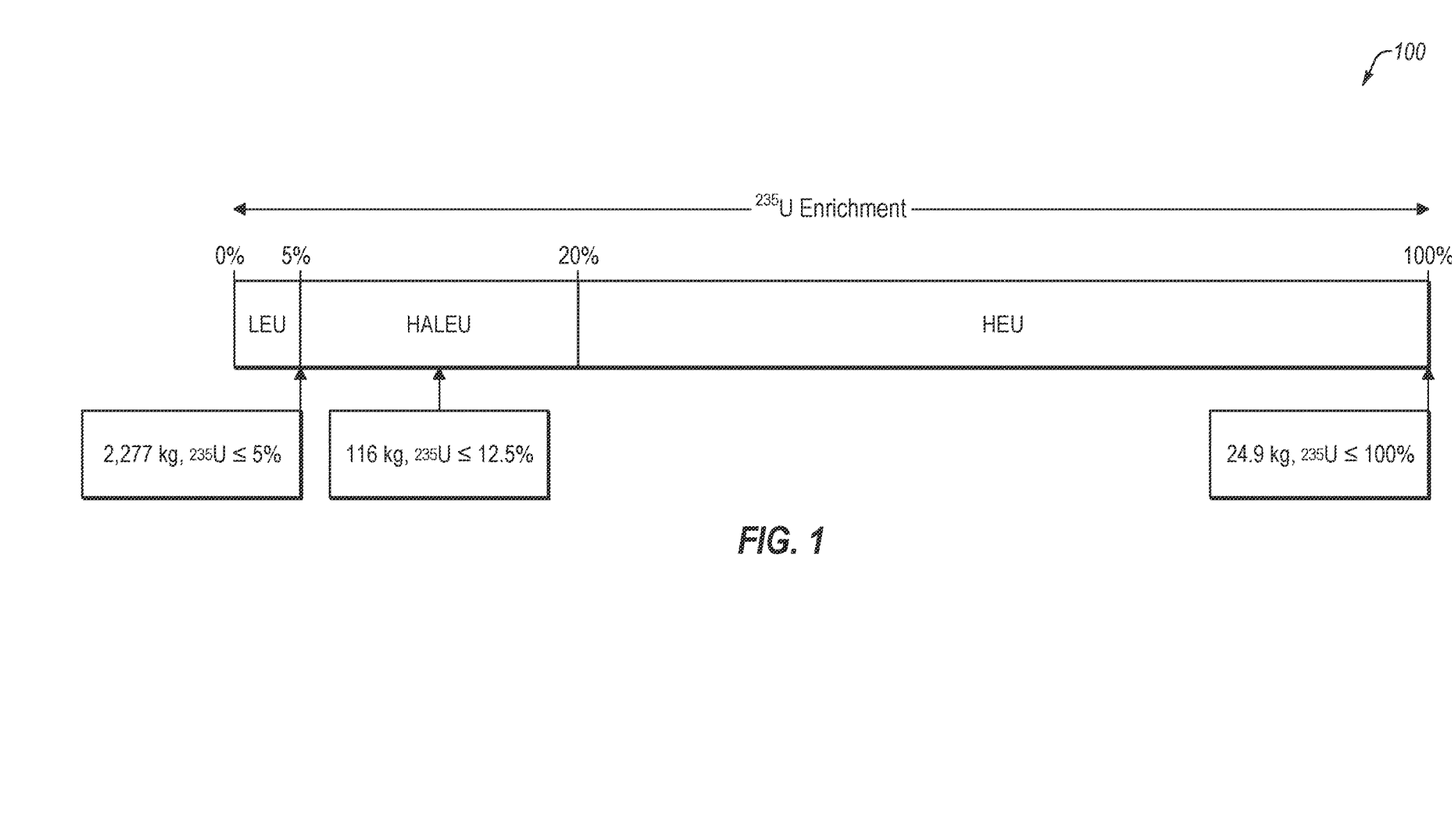
FIG. 1 illustrates a relationship between transportable fissile material quantities and uranium enrichment levels.

Conventional transportation packages include large packages for transporting low-enriched uranium (LEU, $^{235}$U<5 wt %), medium-to-small-sized packages for transporting HALEU (5 wt %<$^{235}$U<20 wt %), and small-sized packages for transporting HALEU and high-enriched uranium (HEU, $^{235}$U>20 wt %). FIG. 1 illustrates a relationship 100 between transportable fissile material quantities and uranium enrichment levels. As illustrated in FIG. 1, an example large package, may be used to transport 2,277 kg of uranium hexafluoride ($UF_6$) enriched up to 5 wt %. An example medium-to-small-sized package may transport 116 kg of $UF_6$ enriched up to 12.5 wt %. Further, small-sized packages may be used to transport 24.9 kg of $UF_6$ enriched up to 100 wt %.

As described more fully below, devices and systems, according to various embodiments, may be configured to transport, for example, approximately 1600 kg to approximately 1900 kg $UF_6$ enriched up to approximately 20 wt %. More specifically, in a more specific, non-limiting example, devices and systems disclosed herein may be configured to transport approximately 1881 kg $UF_6$ enriched up to approximately 20 wt %.

Figure 2:
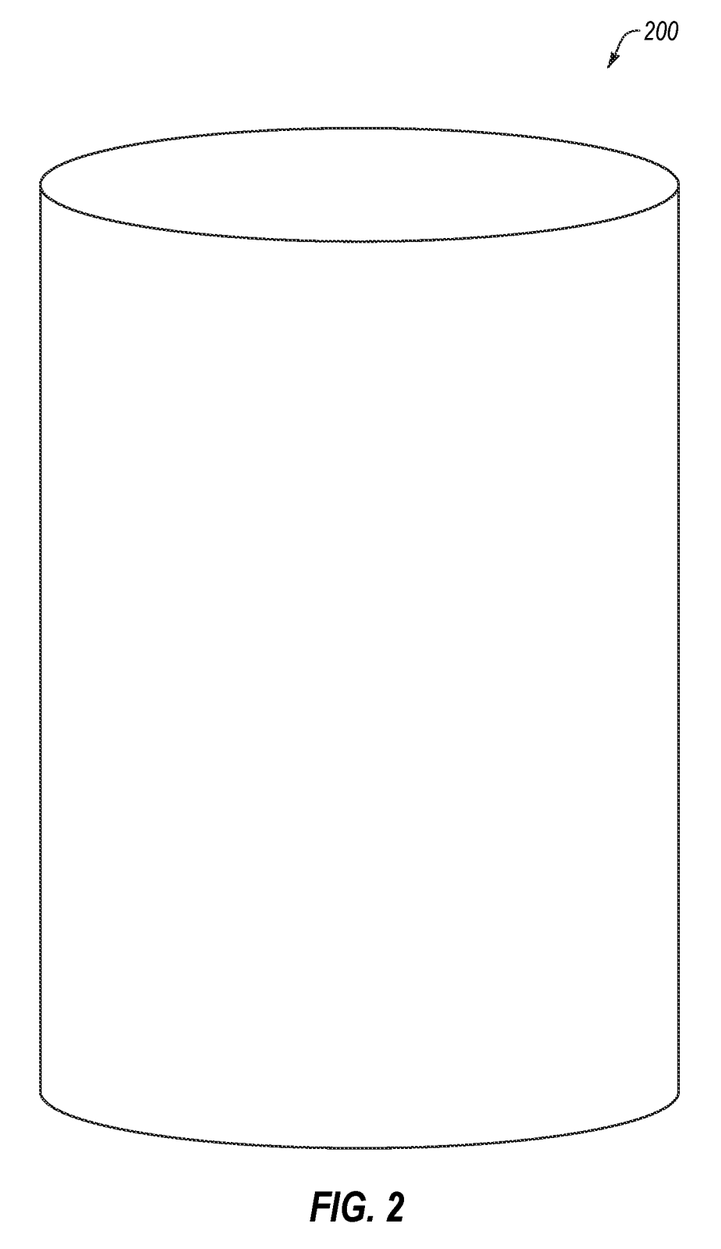
FIG. 2 depicts an example transportation package.

FIG. 2 depicts example packaging (also referred to herein as a "package" or "device") 200. According to some embodiments, packaging 200 may be type B packaging. As will be appreciated by a person having ordinary skill in the art, unlike type A packaging, which is designed to survive normal transport conditions and minor accidents, type B packaging is sturdier and designed to survive severe accident scenarios.

Packaging 200 may include, for example, an Optimus® type B packaging (e.g., Optimus-L packaging) made by the Nuclear Assurance Company (NAC) International of Peachtree Corners, Ga. NAC's Optimus-L packaging may provide sufficient payload capacity and relative ease of handling. According to some embodiments, package 200 may include a stainless steel cask containment vessel (CCV) with a bolted closure system and foam outer packaging (OP), as will be appreciated by a person having ordinary skill in the art.

As will be appreciated, Optimus-L packaging may include one or more lift lugs, one or more lids, closure bolts, a port cover lid O-rings, one or more body portions, and tie-down arms.

As will be described more fully below, package 200 may be configured to receive (i.e., within body 216) a device (e.g., a basket), which may be configured to receive and hold a number of containers (e.g., of reactor fuel, such as HALEU). More specifically, for example, as described more fully below, a device that is configured to receive and secure a number of (e.g., eighteen (18)) containers of material (e.g., reactor fuel) may be positioned and secured within package 200. According to one non-limiting example, package 200, which includes a device with eighteen (18) containers of reactor fuel, may weigh approximately 3,788 kg. Further, for example, up to five (5) packages 200, each including a device with eighteen (18) containers of reactor fuel, and weighing approximately 18,940 kg (i.e., 3,788 kg*5) may be transportable via a LWT.

Figure 3A:
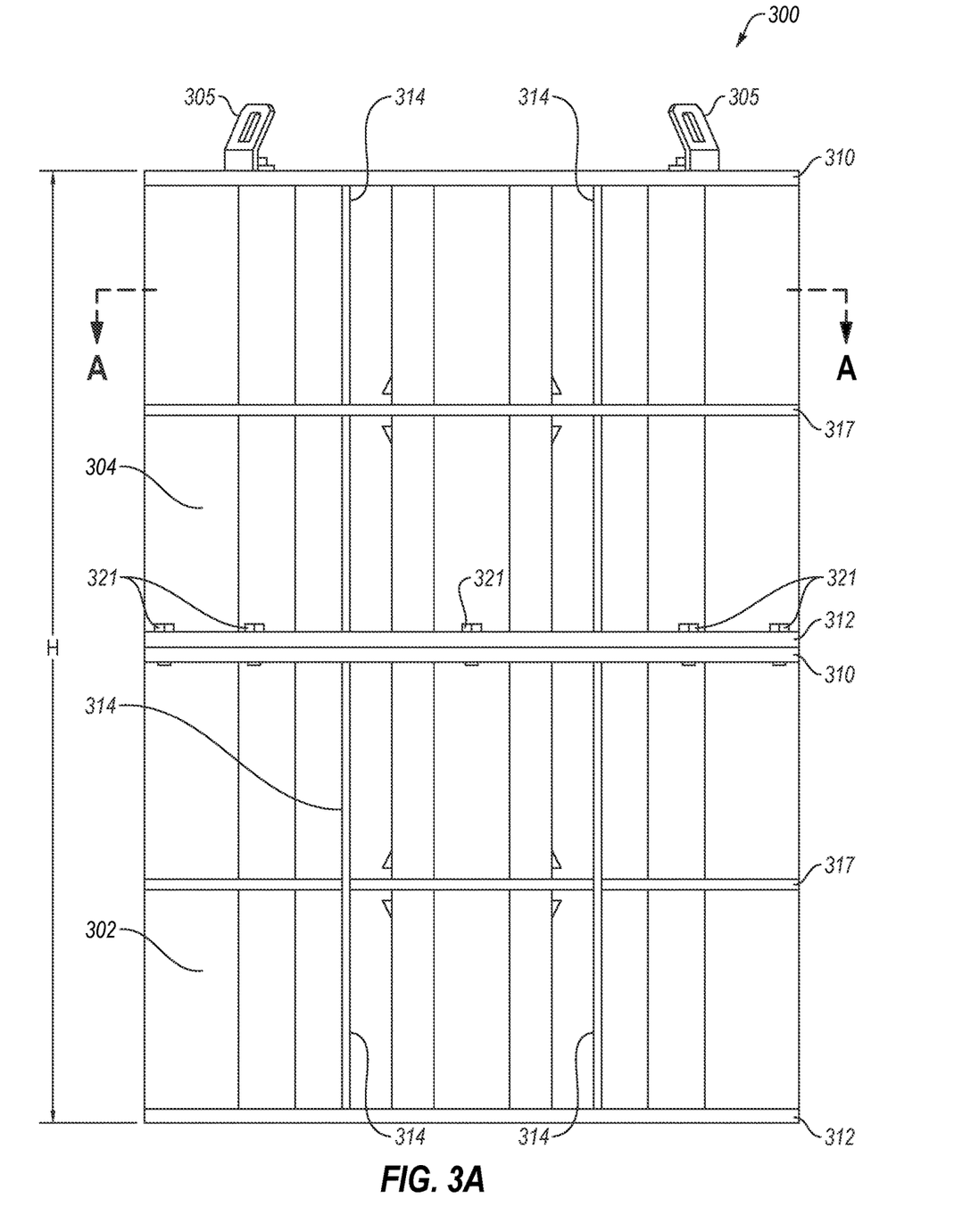
FIG. 3A illustrates an example device, according to various embodiments of the disclosure.

FIG. 3A illustrates an example device 300, according to various embodiments of the disclosure. Device 300, which may also be referred to as a "two-tiered basket," a "tiered basket," or simply a "basket," may include two sections (e.g., two substantially structurally identical sections) 302 and 304, wherein section 304 is positioned, for example, on top of section 302 to form device 300. Each section 302/304 includes a structure (e.g., a "basket structure") 316 (see FIG. 3D) including a top plate 310, a baseplate 312, and ribs 314. For example, at least some of ribs 314 may extend from a first end of a section (e.g., adjacent top plate 310) toward a second end of the section (e.g., to adjacent baseplate 312). Each section 302 and 304 may also include a disk 317 spaced between top plate 310 and baseplate 312. For example only, sections 302 and 304 may be bolted together (e.g., via one or more interface bolts 321). In some examples, device 300 may include one or more lifting lugs 305.

Figure 3B:
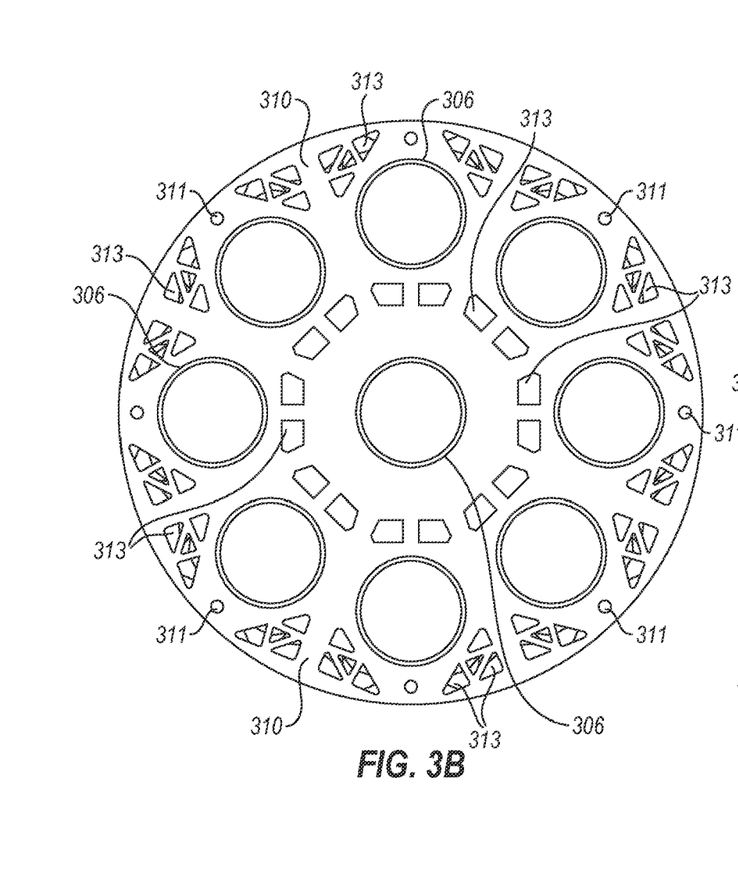
FIG. 3B is top view of the device of FIG. 3A.
Figure 3C:
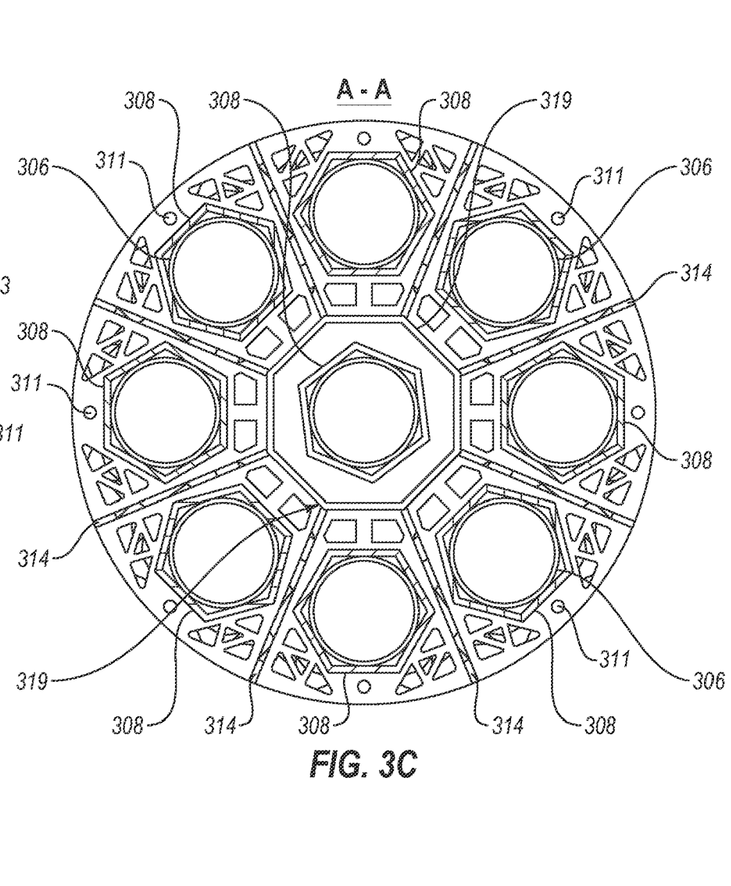
FIG. 3C is a view of the device of FIG. 3A taken along lines A-A of FIG. 3A.

FIG. 3B is top view of device 300, and FIG. 3C is a view of device 300 taken along lines A-A of FIG. 3A. As shown in FIG. 3B, device 300 includes a number of (e.g., nine (9)) compartments 306 for receiving a container 320/400 (see FIG. 3D and/or FIG. 4). For example, each compartment 306 may include, and/or may be referred to as, a sleeve, a storage tube, a tube, or a pipe, for receiving and holding an associated container in a fixed position (e.g., relative to other containers secured by device 300). For example, each compartment 306 may include one or more metals. More specifically, for example, each compartment 306 may include aluminum or another material (e.g., another suitable metal).

Although each section 302/304 of device 300 is illustrated as including nine (9) compartments 306 (or eighteen (18) compartments 306 per device 300), the disclosure is not so limited, and a device including more or less than nine (9) compartments per section (or more or less than eighteen (18) compartments 306 per device) is within the scope of the disclosure. Further, according to some embodiments, one section of a device (e.g., section 302 of device 300) may include a different number of compartments 306 than another section of the device (e.g., section 304 of device 300).

As shown in FIG. 3C, device 300 includes compartments 306, a number of tubes (also referred to herein as "flux traps," "neutron flux traps" "neutron absorbers," "hex sleeves" or simply "sleeves") (e.g., for criticality control) 308, and ribs 314. According to various embodiments, each tube 308 may include a neutron absorber material. As will be appreciated, a flux trap may be formed by the interaction of two neutron absorber materials some distance apart. For example, neutrons originating in HALEU (i.e., within compartments 306) that are able to pass through the surrounding neutron absorber enter the space between absorbers. When a neutron moderator is present in that space (e.g., in this case water intrusion) neutrons lose energy in the moderator and cannot subsequently encounter HALEU without passing through the absorber material a second time. Low energy neutrons are much more likely to be absorbed in the second pass through the absorber material, which renders the system subcritical (safe). The effectiveness of a flux trap is in part dependent on the degree to which the absorber material surrounds the separated masses of HALEU. Gaps in the surrounding "coverage" create pathways for neutrons to reach HALEU without passing through absorber a second time, diluting the effectiveness of the flux trap. Accordingly, a flux trap may be formed by the interaction of two or more separated pieces of absorber material and acts to greatly reduce neutronic interaction between separate masses of HALEU. As a more specific example, tubes 308 may include hexagonal tubes (e.g., hexagonal flux traps).

As illustrated in FIG. 3C, ribs 314 may be positioned at least partially between some compartments 306. As noted above, in at least some embodiments, ribs 314 may extend from adjacent top plate 310 to adjacent baseplate 312. More specifically, for example, ribs 314 may be coupled to top plate 310 and baseplate 312 of an associated section (e.g., section 302 or section 304) of device 300. Further, device 300 may include ribs 319, which may be coupled to ribs 314, may be positioned between a center compartment 306 of a section and other compartments (e.g., exterior compartments) 306 of the section. In some embodiments, disk (also referred to as "intermediate ribs" or "ribs") 317 may provide stiffness (e.g., lateral stiffness) to device 300 and specifically, to ribs 314.

For example, each compartment 306 may be at least partially surrounded by a flux trap 308. Stated another way, each compartment 306 may be at least partially encased by a flux trap 308. In some embodiments, each compartment 306 may be fully encased (i.e., fully surrounded) by a flux trap 308. In a non-limiting example, each flux trap 308 may include a nonstructural borated aluminum sleeve (e.g., approximately 21% natural boron carbide (e.g., for criticality safety) with, for example, an approximately one (1) cm thick wall). As will be appreciated by a person having ordinary skill in the art, flux traps 308 may be designed for and provide criticality control.

Figure 3D:
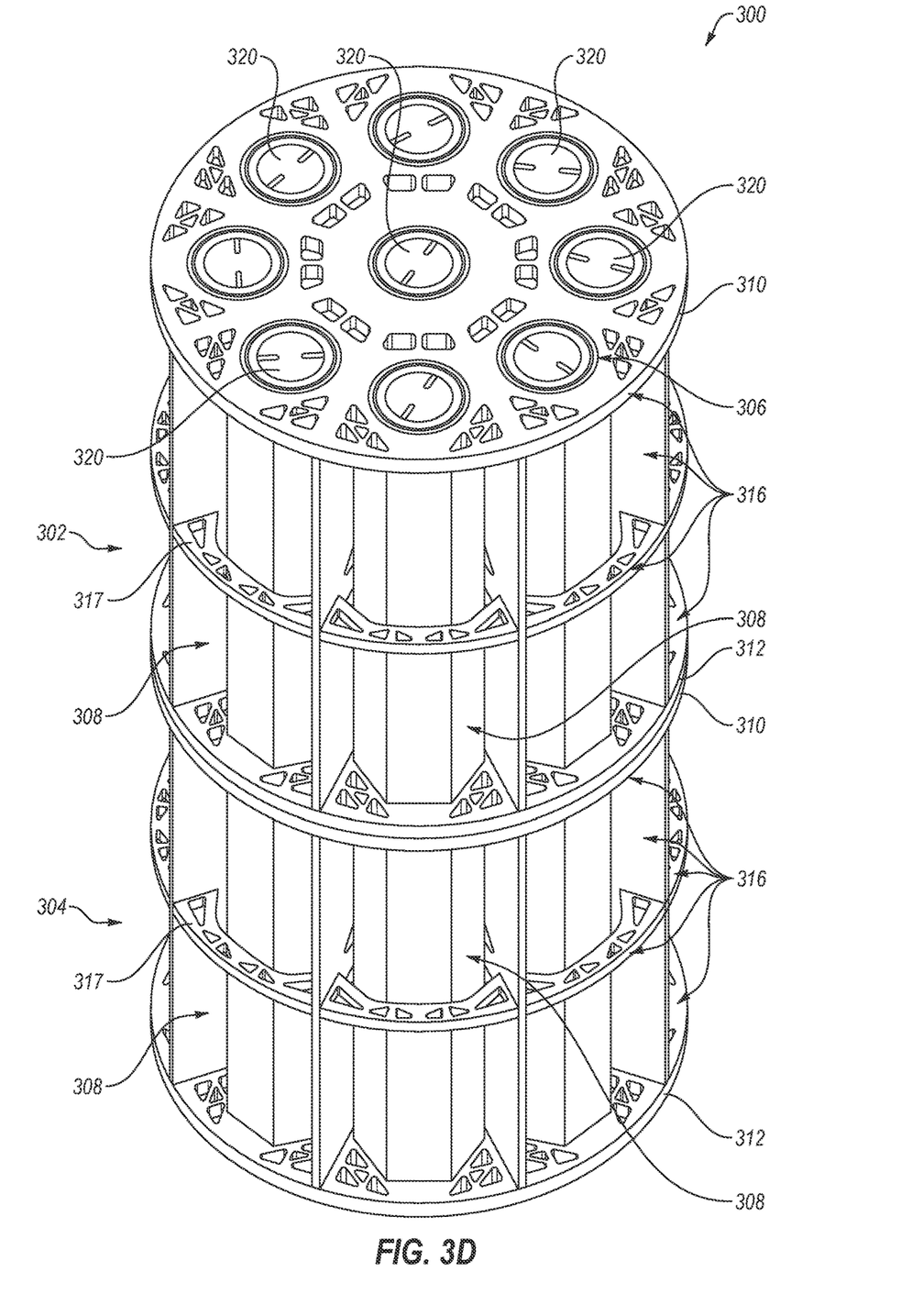
FIG. 3D is a perspective view of the device of FIG. 3A depicting a structure of the device, a number of containers within compartments of the device, and a number of tubes.

FIG. 3D is a perspective view of device 300 depicting a number of containers 320 (i.e., within compartments 306), structure 316 (e.g., including top plate 310, disk 317, baseplate 312 one or more ribs (not shown in FIG. 3D; see ribs 314/319 in FIG. 3C)), and flux traps 308. By way of example, each container 320 may include a canister (e.g., a stainless steel canister).

As a non-limiting example, at least some components of device 300 may be include metal (e.g., aluminum). More specifically, for example, flux traps 308, top plate 310, baseplate 312, disk 317, ribs 314, and/or ribs 319 may include one or more metals (e.g., aluminum and/or other suitable metals). More specifically, for example, structure 316 may include an aluminum basket structure and flux traps 308 may include a borated aluminum (e.g., a borated aluminum hex sleeve). Yet more specifically, for example, flux traps 308 may include a BORTEC® metal matrix composite made by DWA Technologies, Inc. of Chatsworth, Calif. It is noted that the materials for structure 316 and/or flux traps 308 may be selected based on a type of material (e.g., type of reactor fuel) being transported. As illustrated in FIG. 3D, in at least some embodiments, flux traps 308 (and associated compartments 306; see FIG. 3B and/or FIG. 3C) may extend from adjacent top plate 310 (i.e., of an associated section of device 300) through disk 317 to adjacent baseplate 312 (i.e., of the associated section of device 300).

According to some embodiments, device 300 may include a height H (see FIG. 3A) of, for example only, approximately 115 cm to approximately 125 cm (e.g., such as approximately 119.4 cm). In some examples, each individual section 302 and 304 of device 300 may include a height of, for example, approximately 58 cm to approximately 62 cm (e.g., such as approximately 59.7 cm) and hold up to nine (9) containers, for a total capacity of eighteen (18) containers per device 300. Further, for example, top plate 310 and base plate 312 may have a thickness of approximately 1.8 cm to approximately 2.2 cm (e.g., such as approximately 1.9 cm) and a diameter of approximately 75 cm to approximately 90 cm (e.g., such as approximately 82.5 cm), and ribs 314/317/319 may have a thickness of approximately 1.0 cm to approximately 1.5 cm (e.g., such as approximately 1.3 cm).

According to some embodiments, device 300 may include one or more recesses 313 (see FIG. 3B) in the plates (i.e., top plate 310 and/or baseplate 312), disks 317, and/or ribs 314/319 that may reduce the weight of device 300. As noted herein, top plate 310 may include a number of (e.g., nine) compartments 306 (see e.g., FIGS. 3B and 3D) with a diameter of, for example approximately 12 cm to approximately 18 cm (e.g., such as approximately 15.2 cm) that allow for loading of a container (e.g., container 400 of FIG. 4) into compartments 306. For example, one compartment 306 may be located in the center of top plate 310, and other compartments 306 may be equally spaced around a longitudinal axis of device 300 at a radius of, for example only, approximately 25 cm to approximately 30 cm (e.g., such as approximately 28.3 cm). Further, in some embodiments, top plate 310 and baseplate 312 may include a number of (e.g., eight) penetrations 311 (e.g., circular penetrations) (see FIG. 3B; not shown in FIG. 3D). Each penetration 311 may be configured to receive an attachment device (e.g., interface bolt 321; see FIG. 3A) for attaching baseplate 312 of section 302 to top plate 310 of section 304.

For example, compartments 306 may be constructed from, for example, tubing (e.g., 3-gauge tubing) with an outer diameter of, for example, approximately 12 cm to approximately 18 cm (e.g., such as approximately 15.2 cm) and attached (e.g., welded) to top plate 310 and baseplate 312 of device 300. According to some embodiments, each compartment 306 may be encased by a flux trap (e.g., a hexagonal flux trap) with a side length of, for example, approximately 8 cm to approximately 12 cm (e.g., such as approximately 10.0 cm) and a wall thickness of, for example, approximately 1.0 cm to approximately 1.5 cm (e.g., such as approximately 1.3 cm). It is noted that flux traps 308 may or may not provide structural support to device 300 and/or containers 320.

For example, device 300 may have a total mass of, for example, approximately 400 kg to approximately 450 kg (e.g., such as approximately 423.7 kg). According to some embodiments, after being positioned within device 300, container 320 may contact and rest on baseplate 312. In some embodiments, compartments 306 may prevent lateral displacement of container 320 relative to device 300 and/or other containers within device 300. According to some embodiments, containers 320 of section 304 (i.e., a lower section of device 300) may be restrained (i.e., against vertical displacement) via baseplate 312 of section 302 (i.e., an upper section of device 300). Further, containers 320 within section 302 may be restrained (i.e., against vertical displacement) via a lid (e.g., a cask containment vessel (CCV) lid, such as lid 212 of FIG. 2) of an associated package (e.g., package 200 of FIG. 2).

With reference to FIGS. 2 and 3D, device 300, which may include one or more containers, as described more fully below, may be positioned and secured within package 200. More specifically, device 300 may be positioned within body 216 and secured and enclosed within package 200 (e.g., via body 218, lid 212, port cover 210, closure bolts 208, lid closure bolts 206, and lid 204), as will be appreciated by a person having ordinary skill in the art.

Figure 4:
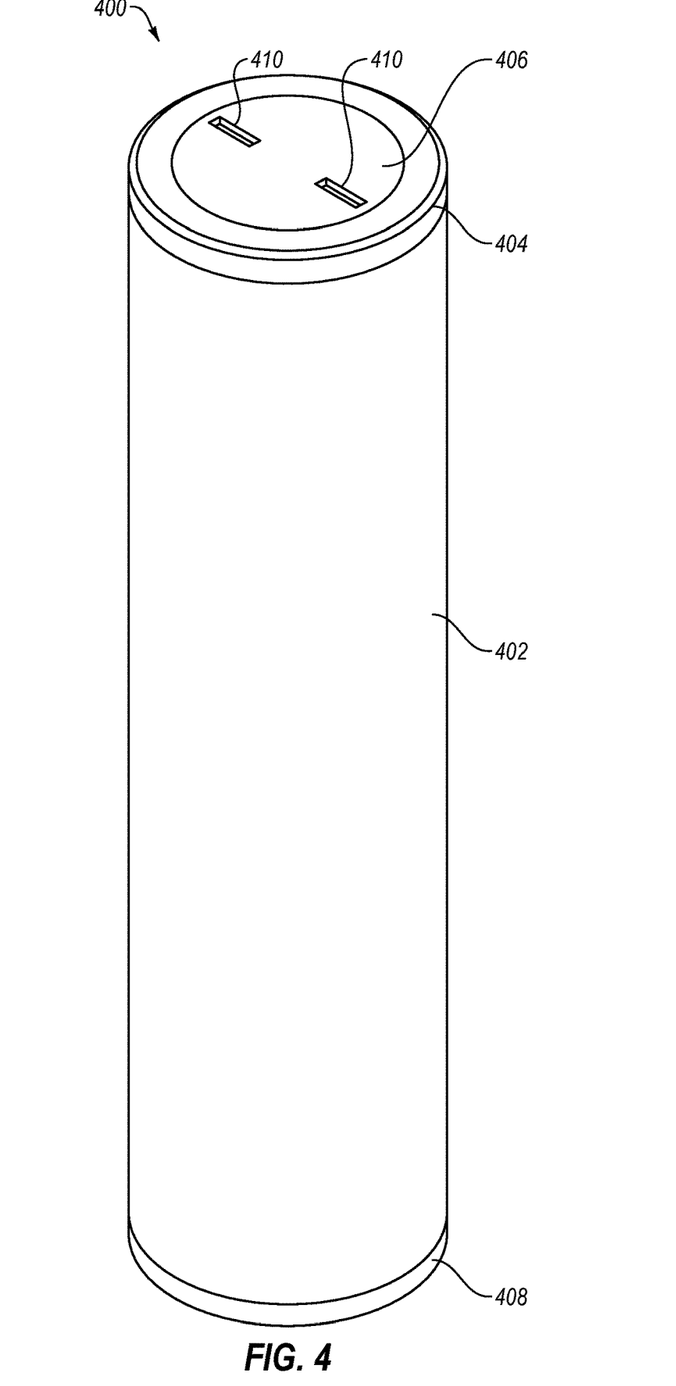
FIG. 4 illustrates an example container, according to various embodiments of the disclosure.

FIG. 4 depicts a container (also referred to herein as a "device") 400, in accordance with various embodiments of the disclosure. Container 400, which may include a canister (e.g., a stainless steel canister) includes a body (also referred to herein as a "shell") 402, a lid (e.g., a top lid) 404, a lid cover 406, and a lid (e.g., a bottom lid) 408. In some embodiments, lid cover 406 may include grooves 410, which may enable lid cover 406 to be manipulated (e.g., rotated) (e.g., with a tool). For example, containers 320 shown in FIG. 3D may include container 400.

In some examples, container 400 may be configured to receive and hold a material (e.g., reactor fuel (e.g., $UO_2$ down-blended from highly enriched uranium)). As a non-limiting examples, a mass of container 400 may be approximately 12 kg to approximately 18 kg (e.g., such as approximately 14.8 kg) and an interior volume of container 400 may be approximately 6500 $cm^3$ to approximately 7500 $cm^3$ (e.g., such as approximately 7000 $cm^3$), which may allow container 400 to receive and hold approximately 14 kg to approximately 28 kg of $UO_2$ powder, depending on an effective density of the $UO_2$ powder. As a more specific example, an inner volume of container 400 may be approximately 7017 $cm^3$, providing space for approximately 20.9 kg of HALEU with a density of approximately 3 $g/cm^3$.

For example, body 402 of container 400 may include tubing (e.g., 3-gauge tubing) with an outer diameter of, for example, approximately 12 cm to approximately 16 cm (e.g., such as approximately 13.97 cm), a wall thickness of approximately 0.5 cm to approximately 0.7 cm (e.g., such as approximately 0.58 cm), and length (e.g., between lid 404 and lid 408) of, for example, approximately 50 cm to approximately 60 cm (e.g., such as approximately 54.9 cm). Lid 408 may have a thickness of, for example, approximately 1.3 cm to approximately 1.9 cm (e.g., such as approximately 1.6 cm). Further, lid cover 406 may include an annular base with a thickness of, for example, approximately 1.0 cm to approximately 2.0 cm (e.g., such as approximately 1.5 cm), and an opening (e.g., a circular opening) (i.e., to allow for insertion and removal of material (e.g., $UO_2$ powder) into/from body 402). The opening may have a diameter of, for example, approximately 6 cm to approximately 9 cm (e.g., such as approximately 7.6 cm). In some embodiments, lid cover 406 may be part of a lid assembly including, for example, a number of (e.g., two) O-rings (e.g., self-energizing, elastomeric O-rings) (not shown) positioned between the annular base of lid 404 and lid cover 406 (e.g., to seal container 400 (e.g., after loading container with material)).

Each of lid 404 and lid 408 may be coupled to body 402. More specifically, for example, each of lid 404 and lid 408 may be welded to body 402. As an example, a total length of container 400 (i.e., including body 402 and lids 404 and 408) may be approximately 54 cm to approximately 63 cm (e.g., such as approximately 57.8 cm). Recesses 410 may be configured for use with a handling tool (e.g., as attachments points).

For example, a mass of a fully filled container 400 may be approximately 35.7 kg, and the total mass of the eighteen (18) fully filled containers may be, for example approximately 642.7 kg. As one example, a payload of eighteen (18) containers including HALEU may be approximately 250 kg to approximately 500 kg per package (e.g., per package 200 of FIG. 2), depending on the $UO_2$ powder density, which may vary for different production and packing methods. In one specific example, a total HALEU payload in eighteen (18) containers may be approximately 376.2 kg.

For example, a number of filled containers 400 may be positioned within a first section (e.g., section 304) of device 300, and thereafter, the first section (e.g., section 304) and a second section (e.g., section 302) of device 300 may be coupled together. Further, according to various embodiments, packaging (e.g., packaging 200 of FIG. 2) may include one or more tie-down points (e.g., tie-down arms 220 of FIG. 2) that may meet various regulatory requirements and may be used to mount a package (e.g., vertically) (e.g., on a transportation pallet). For example, multiple pallets may be mounted on a single LWT trailer. Further, because of the relatively small, lightweight nature of the packaging (e.g., packaging 200 of FIG. 2), specialized lifting equipment may not be necessary to load the packaging.

As noted above, according to some scenarios, up to five (5) packages (e.g., five packages 200 of FIG. 2), each including a device 300 with eighteen (18) containers of reactor fuel, and weighing approximately 18,980 kg (i.e., 3,788 kg*5) may be transportable via a legal-weight truck. According to various simulation results, measured radiation levels of an array of five packages were below regulatory thresholds for a non-exclusive-use conveyance configuration. Current U.S. regulations limit the gross vehicle weight of an LWT to approximately 36.287 kg. Trucks with a gross weight below this threshold may not require a special overweight permit. The payload of a five-axle, semi-trailer can be roughly estimated as 22.679.6 kg, which should be enough capacity to transport five fully loaded packages (e.g., package 200 of FIG. 2) with a total weight of approximately 18,940 kg plus accompanying pallets and tie-down equipment. Thus, various embodiments disclosed herein may enable for a HALEU payload of approximately 376.2 kg per individual package and approximately 1881 kg per LWT when using an array of five individual packages (e.g., with a $UO_2$ bulk powder density of 3 $g/cm^3$).

It is noted that various values provided herein (e.g., dimensions, weights, densities, volumes, number of containers, etc.) are provided as examples only, and other values are within the scope of the disclosure. For example, package 200, device 300, container 400, and/or portions thereof, may be smaller or larger than described, may weigh less than or more than described, may hold more material or less material than described. Further, for example, a device (e.g., device 300 of FIG. 3) may be configured to hold more than eighteen (18) containers or less than eighteen (18) containers. Moreover, other known and suitable packing configurations may be within the scope of the disclosure.

Based on various tests and/or simulations, various embodiments disclosed herein include devices and/or systems that may remain subcritical under various conditions (e.g., hypothetical accident conditions (HAC) and/or normal conditions of transport (NCT)), may provide sufficient radiological protection to operating personnel and the surrounding environment, may be structurally sound, may sufficiently contain and confine a material (HALEU), and may sustain required thermal loads.

As used herein, the terms "substantially" and "approximately" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially or approximately met, the parameter, property, or condition may be at least 90% met, at least 95% met, or even at least 99% met.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A device, comprising:
    at least one section, each section of the at least one section including:
        a number of storage tubes, each storage tube extending from adjacent a first end of the section toward a second, opposite end of the section and configured to receive and hold a container; and
        a number of flux traps, each storage tube of the number of storage tubes at least partially surrounded by a flux trap of the number of flux traps.

2. The device of claim 1, wherein the at least one section comprises a first, upper section and a second, lower section positioned adjacent the first, upper section, wherein each of the first, upper section and the second, lower section is configured to receive and hold nine (9) containers.

3. The device of claim 1, wherein each section of the at least one section includes nine (9) storage tubes.

4. The device of claim 1, wherein each section of the at least one section includes:
    a top plate;
    a baseplate; and
    a number of ribs extending from approximate the top plate to approximate the baseplate.

5. The device of claim 4, wherein each section of the at least one section includes at least one lifting lug coupled to the top plate.

6. The device of claim 1, wherein each flux trap of the number of flux traps comprises a metal sleeve having a thickness of substantially one (1) centimeter or more.

7. The device of claim 1, wherein each section of the at least one section comprises an aluminum structure.

8. The device of claim 7, wherein each flux trap of the number of flux traps comprises borated aluminum.

9. A device, comprising:
   a first portion and a second portion positioned adjacent the first portion, each of the first portion and the second portion including:
      a number of sleeves, each sleeve extending from adjacent a top plate of an associated portion toward a baseplate of the associated portion; and
      a number of flux traps, each sleeve of the number of sleeves encased by a flux trap of the number of flux traps.

10. The device of claim 9, wherein the first portion is an upper portion and the second portion is a lower portion, wherein the baseplate of the first portion is positioned adjacent the top plate of the second portion.

11. The device of claim 9, wherein each of the first portion and the second portion comprises an aluminum structure and each of the number of flux traps comprises borated aluminum.

12. The device of claim 9, wherein each flux trap has a side length of approximately 10.0 centimeters and a wall thickness of approximately 1.3 centimeters.

13. The device of claim 9, wherein each sleeve is configured to receive a container including high-assay low-enriched uranium (HALEU).

14. The device of claim 9, wherein each of the first portion and the second portion includes nine (9) sleeves such that each of the first portion and the second portion is configured to receive nine (9) containers.

15. A system, comprising:
   a package; and
   a basket configured to be positioned within the package and including:
      a first, upper tier section and a second, lower tier section, each of the first, upper tier section and the second, lower tier section including:
         a number of compartments, each compartment of the number of compartments configured to receive a container; and
         a number of sleeves, each sleeve of the number of sleeves at least partially surrounding the compartment of the number of compartments.

16. The system of claim 15, wherein the package comprises a type B package including a cask containment vessel with a bolted closure system.

17. The system of claim 15, wherein the basket comprises aluminum.

18. The system of claim 15, wherein each of the first, upper tier section and the second, lower tier section include nine (9) compartments.

19. The system of claim 15, wherein each sleeve of the number of sleeves comprises a hexagonal-shaped, neutron-absorbing flux trap.

20. The system of claim 15, wherein the basket is configured to receive a number of containers including approximately 350 kilograms to 400 kilograms of high-assay low-enriched uranium (HALEU).

21. The system of claim 15, further comprising a number of containers including the container, each container comprising a canister configured to hold reactor fuel.

22. A system, comprising:
   a number of containers; and
   a basket including:
      a number of tubes, each tube of the number of tubes sized and configured to receive and secure a container of the number of containers; and
      a number of flux traps, each flux trap surrounding an associated tube of the number of tubes.

23. The system of claim 22, wherein each of the number of containers includes:
   a body;
   a first lid;
   a second lid opposite the first lid and including an annular base with an opening; and
   a lid cover configured to be positioned within the opening to seal the container.

24. The system of claim 22, wherein each container is configured to hold up to substantially 28 kilograms of a high-assay low-enriched uranium (HALEU) fuel.

25. The system of claim 22, further comprising a type B package including a body, wherein the basket is configured to be positioned within the body of the type B package.

* * * * *

UNITED STATES PATENT AND TRADEMARK OFFICE
CERTIFICATE OF CORRECTION

PATENT NO. : 11,699,534 B2
APPLICATION NO. : 17/447712
DATED : July 11, 2023
INVENTOR(S) : Elmar F. Eidelpes et al.

It is certified that error appears in the above-identified patent and that said Letters Patent is hereby corrected as shown below:

In the Specification

| | | |
|---|---|---|
| Column 9, | Line 54, | change "approximately 36.287 kg." to --approximately 36,287 kg.-- |
| Column 9, | Line 57, | change "as 22.679.6 kg," to --as 22,679.6 kg, which-- |

Signed and Sealed this
Fifth Day of November, 2024

*Katherine Kelly Vidal*
Katherine Kelly Vidal
*Director of the United States Patent and Trademark Office*